(12) United States Patent
Patil et al.

(10) Patent No.: US 11,886,741 B2
(45) Date of Patent: Jan. 30, 2024

(54) METHOD AND STORAGE DEVICE FOR IMPROVING NAND FLASH MEMORY PERFORMANCE FOR INTENSIVE READ WORKLOADS

(71) Applicant: SAMSUNG ELECTRONICS CO., LTD., Suwon-si (KR)

(72) Inventors: Tushar Tukaram Patil, Suwon-si (KR); Anantha Sharma, Suwon-si (KR); Sharath Kumar Kodase, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/459,539

(22) Filed: Aug. 27, 2021

(65) Prior Publication Data

US 2022/0334768 A1 Oct. 20, 2022

(30) Foreign Application Priority Data

Apr. 16, 2021 (IN) .............................. 202141017782

(51) Int. Cl.
G06F 3/06 (2006.01)
G06F 11/10 (2006.01)
G06F 12/10 (2016.01)

(52) U.S. Cl.
CPC .......... *G06F 3/0659* (2013.01); *G06F 3/0611* (2013.01); *G06F 3/0631* (2013.01);
(Continued)

(58) Field of Classification Search
CPC .... G06F 3/0659; G06F 3/0611; G06F 3/0631; G06F 3/0656; G06F 3/0679; G06F 11/1004; G06F 12/10; G06F 2212/657
See application file for complete search history.

(56) References Cited

U.S. PATENT DOCUMENTS 10,114,584 B2 10/2018 Gorobets et al.
10,255,179 B2 4/2019 Ji et al.
(Continued)

FOREIGN PATENT DOCUMENTS

CN 109977031 A 7/2019
KR 1020140075396 A 6/2014

OTHER PUBLICATIONS

S.-K. Lu, Z.-L. Tsai, C.-L. Hsu and C.-T. Sun, "ECC Caching Techniques for Protecting NAND Flash Memories," 2020 IEEE International Test Conference in Asia (ITC-Asia), 2020, pp. 47-52, doi: 10.1109/ITC-Asia51099.2020.00020. (Year: 2020).*

(Continued)

*Primary Examiner* — Ramon A. Mercado
(74) *Attorney, Agent, or Firm* — Sughrue Mion, PLLC

(57) ABSTRACT

A method for reading data in a storage device is provided. The method includes receiving a read command from a host device, wherein the read command indicates stored data in the storage device and a Logical Block Address (LBA) of the stored data; obtaining a Physical Block Number (PBN) based on the LBA and a Logical to Physical (L2P) mapping; determining whether the PBN corresponds to a volatile memory of the storage device; reading the stored data directly from the volatile memory based on the PBN corresponding to the volatile memory; incrementing a read counter associated with the PBN based on the stored data being read directly from the volatile memory; and reading the stored data from a non-volatile memory of the storage device based on the PBN not corresponding to the volatile memory.

20 Claims, 6 Drawing Sheets

(52) U.S. Cl.
CPC .......... *G06F 3/0656* (2013.01); *G06F 3/0679* (2013.01); *G06F 11/1004* (2013.01); *G06F 12/10* (2013.01); *G06F 2212/657* (2013.01)

(56) References Cited

U.S. PATENT DOCUMENTS

| | | | |
|---|---|---|---|
| 10,452,115 | B2 | 10/2019 | Fernandes |
| 10,481,830 | B2 | 11/2019 | Higgins et al. |
| 10,585,594 | B1* | 3/2020 | Armangau ............ G06F 12/123 |
| 2009/0125671 | A1* | 5/2009 | Flynn .................. G06F 11/1008 711/170 |
| 2014/0195480 | A1 | 7/2014 | Talagala et al. |
| 2016/0225461 | A1 | 8/2016 | Tuers et al. |
| 2017/0075812 | A1* | 3/2017 | Wu ..................... G06F 12/0868 |
| 2018/0173464 | A1 | 6/2018 | Wongso et al. |
| 2019/0129839 | A1* | 5/2019 | Kim ....................... G06F 3/0659 |
| 2019/0324688 | A1* | 10/2019 | Kang ..................... G11C 16/26 |
| 2020/0110708 | A1 | 4/2020 | Ma et al. |
| 2021/0342094 | A1* | 11/2021 | Liu ........................ G06F 3/0674 |
| 2021/0349662 | A1* | 11/2021 | Helm .................... G06F 3/0659 |
| 2022/0091984 | A1* | 3/2022 | Das ..................... G06F 12/0866 |
| 2022/0253245 | A1* | 8/2022 | Seo ....................... G06F 3/0679 |

OTHER PUBLICATIONS

Yixin Luo "Architectural Techniques for Improving NAND Flash Memory Reliability," School of Computer Science Carnegie Mellon University, Pittsburgh, PA 15213, CMU-CS-18-101, Mar. 2018, (255 total pages).
European Search Report dated Sep. 21, 2022 by the European Patent Office in EP Patent Application No. 22164929.6.
Communication dated Aug. 1, 2023, issued by European Patent Office in European Patent Application No. 22164929.6.

* cited by examiner

METHOD AND STORAGE DEVICE FOR IMPROVING NAND FLASH MEMORY PERFORMANCE FOR INTENSIVE READ WORKLOADS

CROSS-REFERENCE TO THE RELATED APPLICATION

This application claims priority from Indian Patent Application No. 202141017782 filed on Apr. 16, 2021 in the Office of the Controller General of Patents, Designs and Trade Marks, the disclosure of which is incorporated herein by reference in its entirety.

BACKGROUND

1. Field

Methods, apparatuses and systems consistent with example embodiments relate to a Solid State Drive (SSD), and more specifically to a method and storage device for improving a NOT AND (NAND) flash memory performance for intensive read workloads on a storage device.

2. Related Art

A NAND flash memory generally uses a type of non-volatile storage that does not require power to retain data. For example, a mobile phone includes a NAND flash memory (e.g., micro SD card/memory chip) to store data files such as photos, videos and music, which remain stored even if power to the NAND flash memory is lost. The NAND flash memory includes a plurality of flash blocks where the data are stored/saved/written. Once the data is written on the NAND flash memory, the NAND flash memory may encounter various physical disturbances, such as temperature change, and disturbances due to read-intensive workloads, etc. Due to these disturbances, the data saved on the NAND flash memory can be corrupted. Moreover, performance may be effected by intensive read workloads. In this regard, a storage device with error correction codes and improved performance during intensive read workloads is needed.

SUMMARY

One or more example embodiments provide a method and storage device for improving a NAND flash memory performance during intensive read workloads. One or more example embodiments use a volatile memory of the storage device when a read disturbance (e.g., RR error) occurs on a flash block of the NAND flash memory and crosses a maximum read limit of the flash block of the NAND flash memory to avoid data loss (e.g., UECC) during intensive read workloads on the storage device.

One or more example embodiments allocate a buffer in the volatile memory when the read disturbance occurs on the flash block of the NAND flash memory and crosses the maximum read limit of the flash block of the NAND flash memory to improvise the NAND flash memory performance for intensive read workloads without throttling of a read command received from a host device.

One or more example embodiments optimize a read performance of the storage device when recovery operations are operating on the flash block of the NAND flash memory to avoid data loss.

According to an aspect of an example embodiment, a method for reading data in a storage device includes: receiving, by the storage device, a read command from a host device, wherein the read command comprises a Logical Block Address (LBA) of stored data to be read; obtaining, by the storage device, a Physical Block Number (PBN) based on the LBA and a Logical to Physical (L2P) mapping; determining, by the storage device, whether the PBN corresponds to a volatile memory of the storage device; reading, by the storage device, the stored data directly from the volatile memory based on the PBN corresponding to the volatile memory; incrementing, by the storage device, a read counter associated with the PBN based on the stored data being read directly from the volatile memory; and reading, by the storage device, the stored data from a non-volatile memory of the storage device based on the PBN not corresponding to the volatile memory.

According to an aspect of an example embodiment, a storage device includes a memory; a non-volatile memory; and a storage device controller. The storage device controller is operably connected to the volatile memory and the non-volatile memory, and is configured to: receive a read command from a host device, wherein the read command comprises a Logical Block Address (LBA) of stored data to be read; obtain a Physical Block Number (PBN) based on the LBA and a Logical to Physical (L2P) mapping; determine whether the PBN corresponds to the volatile memory; read the stored data directly from the volatile memory based on the PBN corresponding to the volatile memory; incrementing a read counter associated with the PBN based on the stored data being read directly from the volatile memory; and read the stored data from the non-volatile memory based on the PBN not corresponding to the volatile memory.

According to an aspect of an example embodiment storage device controller includes at least one processor configured to: receive a read command from a host device, wherein the read command comprises a Logical Block Address (LBA) of stored data to be read; obtain a Physical Block Number (PBN) based on the LBA and a Logical to Physical (L2P) mapping; determine whether the PBN corresponds to a volatile memory of a storage device; read the stored data directly from the volatile memory based on the PBN corresponding to the volatile memory; incrementing a read counter associated with the PBN based on the stored data being read directly from the volatile memory; and read the stored data from a non-volatile memory of the storage device based on the PBN not corresponding to the volatile memory.

BRIEF DESCRIPTION OF THE DRAWINGS

The above and other aspects, features and advantages will become more apparent from the following description of example embodiments with reference to the accompanying drawings, in which.

DETAILED DESCRIPTION

Example embodiments, and various features and advantageous thereof, are explained more fully with reference to accompanying drawings. Descriptions of well-known components and processing techniques are omitted so as to not unnecessarily obscure the example embodiments disclosed herein. Also, the example embodiments described herein are not necessarily mutually exclusive, as some example embodiments can be combined with one or more other example embodiments to form new embodiments. The term "or" as used herein, refers to a non-exclusive or, unless otherwise indicated. The examples used herein are intended merely to facilitate an understanding of ways in which example embodiments herein can be practiced and to further enable those skilled in the art to practice example embodiments. Accordingly, the examples should not be construed as limiting the scope of the example embodiments herein.

As is traditional in the field, example embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block may be physically separated into two or more interacting and discrete blocks without departing from the scope of the invention. Likewise, the blocks may be physically combined into more complex blocks without departing from the scope of the invention The accompanying drawings are used to provide an overview of technical features and it should be understood that example embodiments are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Figure 1:
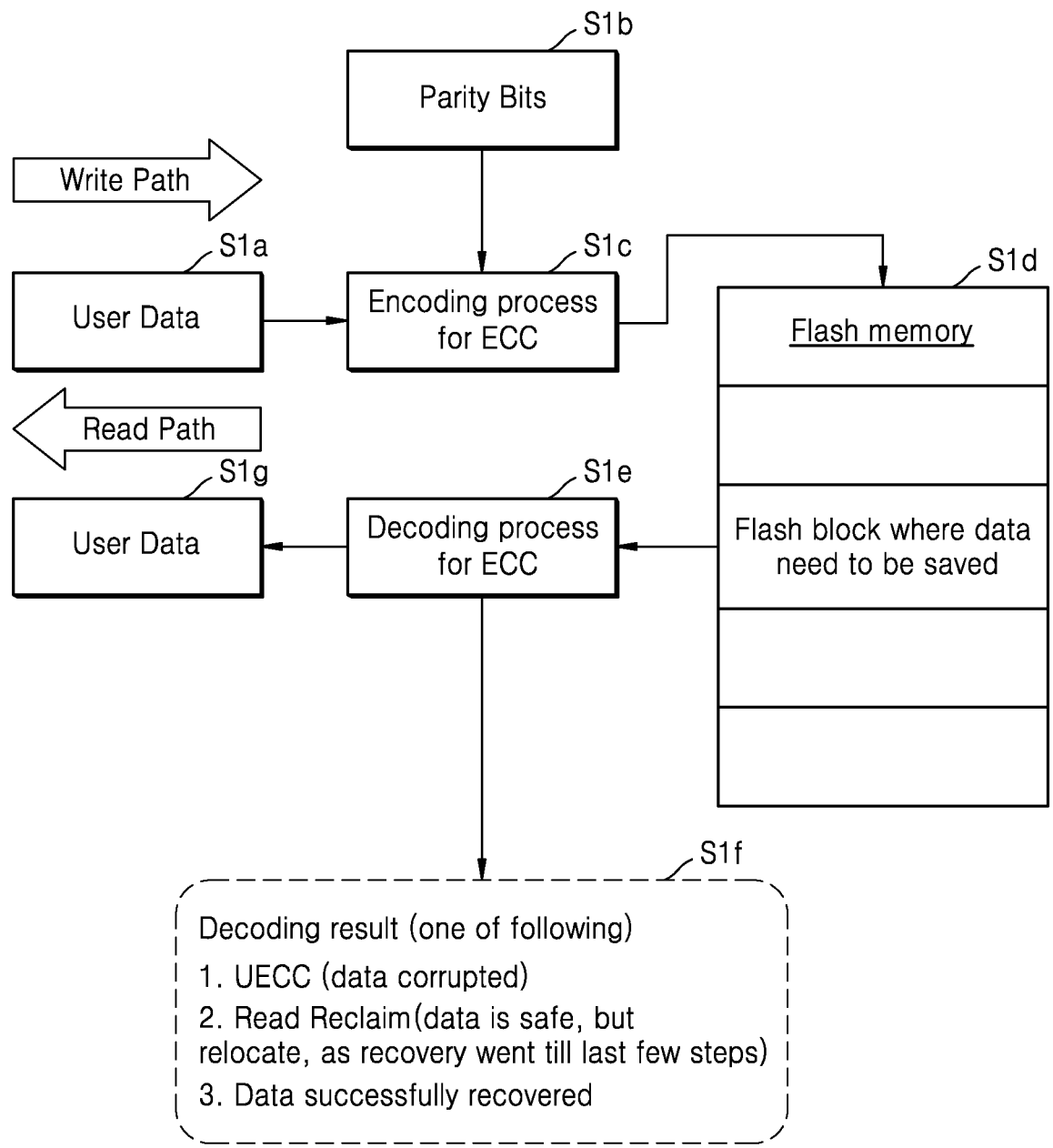
FIG. 1 illustrates a block diagram of an error correction system used to store data in a NAND flash memory.

FIG. 1 illustrates a block diagram of an error correction system used to store data in a NAND flash memory S1$d$. The data S1$a$ is stored/written on the NAND flash memory S1$d$ with parity bits S1$b$ (e.g., redundant bits) using an encoding process for error-correcting codes (ECC) S1$c$. The stored data is read from the NAND flash memory S1$d$ using a decoding process for the ECC S1$e$. Output S1$f$ of the decoding process for the ECC S1$e$ indicates one of:

i. Uncorrectable ECC (UECC). The stored data is corrupted, the decoding process for the ECC S1$e$ is unable to correct the stored data (i.e., obtain original data) from the NAND flash memory S1$d$.

ii. Read Reclaim (RR) error. The decoding process for ECC S1$e$ determines that the stored data is safe but the stored data of the NAND flash memory S1$d$ needs to be relocated to another flash block of the NAND flash memory S1$d$.

iii. Data successfully recovered. The stored data is successfully recovered by the decoding process for the ECC S1$e$.

Furthermore, the NAND flash memory S1$d$ has specific features such as the NAND flash memory S1$d$ does not support overwrite property on the flash blocks. Due to the specific feature, once the flash blocks are filled with the data (old data/older block), new data may be written to the filled flash blocks after the old data is erased from the filled flash blocks. Each flash block in the NAND flash memory S1$d$ has an "Erase Count (EC)". If the EC of the flash block goes beyond a maximum read limit of the NAND flash memory S1$d$, the NAND flash memory S1$d$ can give errors when reading the old data. Hence, the NAND flash memory S1$d$ tries to maintain a uniform EC count using a "Garbage collection (GC)" system by relocating the old data (e.g., RR) in the NAND flash memory S1$d$.

Figure 2:
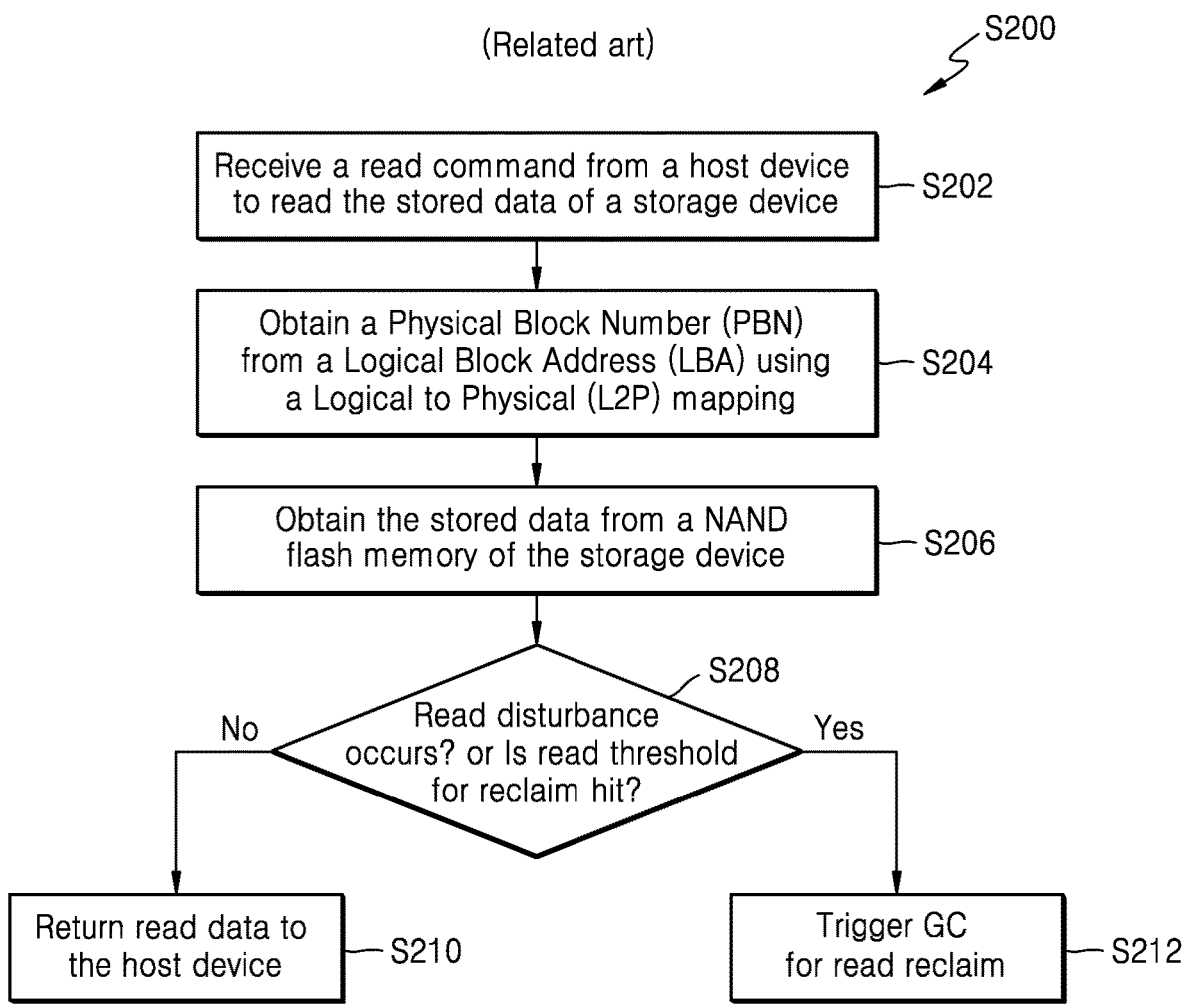
FIG. 2 is a flow diagram illustrating a GC system for relocating old data in the NAND flash memory.

FIG. 2 is a flow diagram of a GC system for relocating the old data in the NAND flash memory. At S202, a read command is received from a host device to read the stored data of a storage device, the read command includes a Logical Block Address (LBA). At S204, a Physical Block Number (PBN) is obtained from the LBA using a Logical to Physical (L2P) mapping. At S206, the stored data is read from a NAND flash memory of the storage device. At S208, it is determined whether a read disturbance (i.e., RR) occurs while reading the stored data and determining whether a read-threshold counter on the PBN crosses a maximum read limit. The maximum read limit is provided by a manufacturer of the NAND flash memory. At S210, read data is provided to the host device when the read disturbance does not occur while reading the stored data and the read-threshold counter on the PBN does not cross the maximum read limit. At S212, the GC system is triggered for RR when the read disturbance occurs while reading the stored data or the read-threshold counter on the PBN crosses the maximum read limit. Once triggered, the GC system starts relocation of the old data in the NAND flash memory.

During the relocation of the old data in the NAND flash memory, if again the read command (host read) is received from the host device on the same PBN, the host read is given high priority than a GC read for the relocation. This may create the UECC when the read count (EC) on the PBN goes above the maximum read limit after the RR. As a result, the RR error occurs, stored data is corrupted and the decoding process for ECC is unable to correct stored/get original data back from the NAND flash memory. The RR error increases as the flash block size increases, which occurs every time during a new version of the NAND flash memory. Each version can take more time to complete one of the GC read operations. In that case, there is a high probability that the flash block which got the RR error, may receive the read command again from the host device and the read count (EC) on the PBN goes above the maximum read limit after the RR which lead to corruption of the stored data (UECC). Thus, it is desired to provide a useful alternative for improving the NAND flash memory performance for intensive read workloads.

Figure 3:
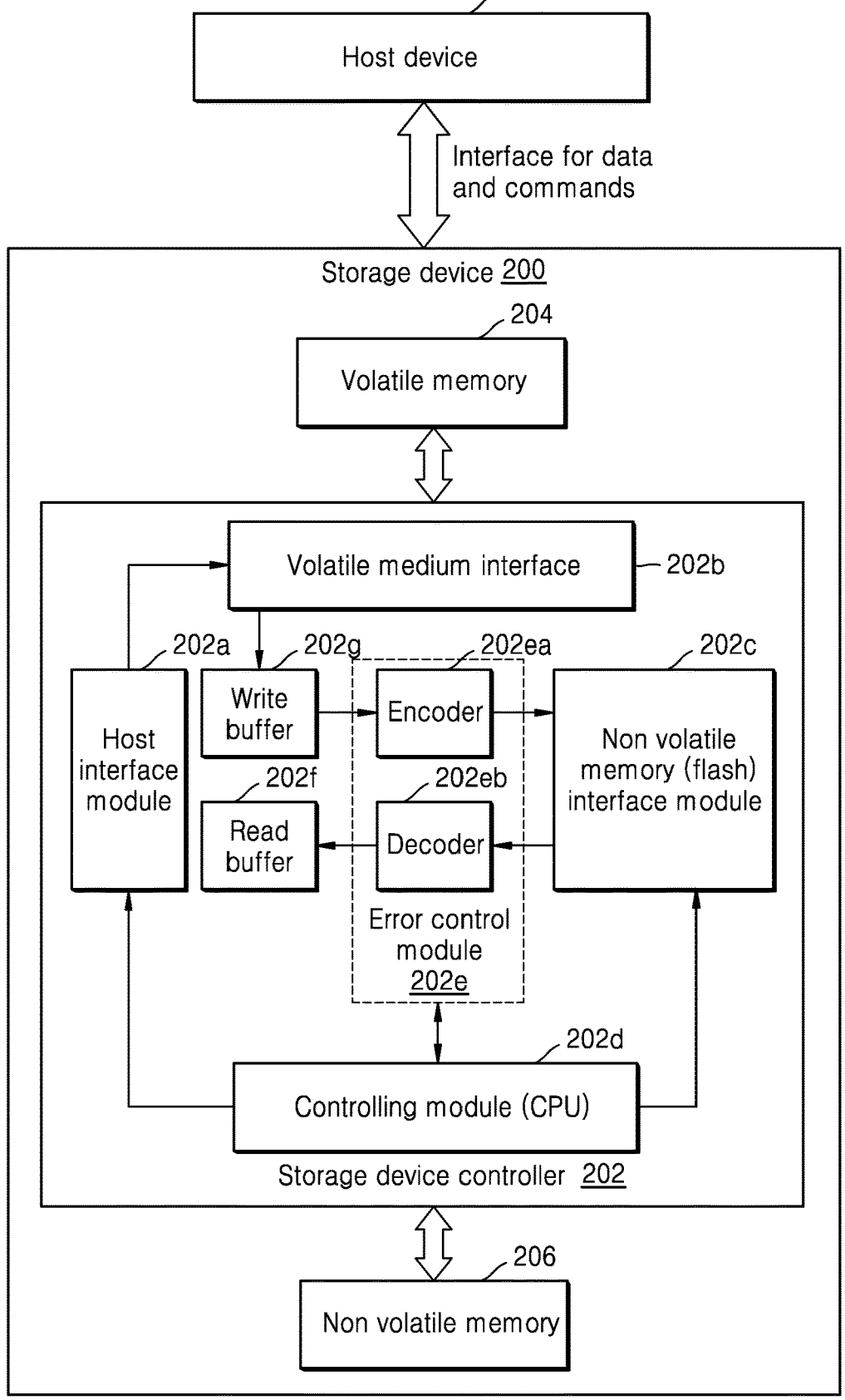
FIG. 3 illustrates a NAND flash memory system, according to an example embodiment.

FIG. 3 illustrates a NAND flash memory system, according to an example embodiment.

Referring to FIG. 3, in an example embodiment, host storage system 10 includes a host device 100 and a storage device 200. The host device 100 can include, for example, a smartphone, a laptop, or a smart television (TV). Example embodiments are not limited to these specific devices, and the host device 100 may include other devices. The storage device 200 can include, for example, an SSD, a micro SD card, a flash memory. Example embodiments are not limited to these specific devices, and the storage device 200 may include other devices. The host device 100 and the storage device 200 communicate with each other using an interface and corresponding interface protocol such as a Serial Advanced Technology Attachment (SATA), Serial-Attached SCSI (SAS), and a Non-Volatile Memory Express (NVME). Example embodiments are not limited to these specific interfaces and interface protocols, and other interfaces and interface protocols may be used.

In an example embodiment, the storage device 200 includes a storage device controller 202, a volatile memory 204, and a non-volatile memory 206. The storage device controller 202 is implemented by processing circuitry such as logic gates, integrated circuits, microprocessors, microcontrollers, memory circuits, passive electronic components, active electronic components, optical components, hardwired circuits, or the like, and may, for example, be driven by firmware. The circuits may, for example, be embodied in one or more semiconductor chips, or on one or more substrate supports such as a printed circuit boards and the like.

The storage device controller 202 is configured to receive a read command from the host device 100 to read stored data of the storage device 200. The read command includes an LBA of the stored data. The LBA has a logical address which ranges from a minimum LBA (e.g., 0) to a maximum LBA. The maximum LBA depends on the storage capacity of the storage device 200 (e.g., 512 bytes for a storage device of 512 kb). The interface protocols may have an option to configure logical addresses according to a request made by the host device 100. Further, the storage device controller 202 is configured to obtain a PBN from the LBA using an L2P mapping. Further, the storage device controller 202 is configured to determine whether the PBN corresponds to the volatile memory 204 of the storage device 200. If the logical block address (LBA) of the stored data is mapped to physical block number (PBN) in the volatile memory, LBA and PBN corresponds to the volatile memory 204 of the storage device 200. Further, the storage device controller 202 is configured to read the stored data directly from the volatile memory 204 in response to determining that the PBN corresponds to the volatile memory 204, and increment a read counter associated with the PBN when the stored data is read. Further, the storage device controller 202 is configured to read the stored data from the non-volatile memory 206 of the storage device 200 in response to determining that the PBN does not correspond to the volatile memory 204.

Further, the storage device controller 202 is configured to determine whether a read disturbance exceeds a threshold limit while reading the stored data from the non-volatile memory 206. Further, the storage device controller 202 is configured to read the stored data from the non-volatile memory 206 in response to determining that the read disturbance does not exceed the threshold limit while reading the stored data from the non-volatile memory 206 and the read-threshold counter on the PBN does not cross the maximum read limit. Further, the storage device controller 202 is configured to allocate a buffer in the volatile memory 204 in response to determining that the read disturbance exceeds the threshold limit while reading the stored data from the non-volatile memory 206.

The storage device controller 202 is configured to determine whether the allocation of the buffer in the volatile memory 204 is successful. Further, the storage device controller 202 is configured to relocate the stored data from the non-volatile memory 206 to the volatile memory 204 in response to determining that the allocation of the buffer in the volatile memory 204 is successful, update the L2P mapping, and read the stored data from the volatile memory 204.

Further, the storage device controller 202 is configured to relocate data from the volatile memory 204) to the non-volatile memory 206 in response to determining that the allocation of the buffer in the volatile memory 204 is not successful.

The data includes a low read counter among a plurality of read counters of the volatile memory 204. For example, a count may indicate a maximum PBN data that can be stored in the volatile memory. For example, the count of the maximum PBN data may be N, and there may be a structure that will store a key as PBN whose data in an $i^{th}$ element among N elements, and a corresponding Read Counter for each entry. When all N entries are occupied, and there is an outstanding request to allocate an $(N+1)^{th}$ entry, the entry having the lowest read counter will be replaced with a new allocation (similar to the least recently used (LRU)).

Further, the storage device controller 202 is configured to determine a buffer with the lowest read counter in the volatile memory 204. Further, the storage device controller 202 is configured to allocate a Single-level cell (SLC) NAND flash memory in the non-volatile memory 206 to store the data. Further, the storage device controller 202 is configured to relocate the data in the SLC NAND flash memory and update the PBN associated with the data. The storage device controller 202 then attempts to allocate the buffer in the volatile memory.

In an example embodiment, the storage device controller 202 includes a host interface module 202a, a volatile medium interface 202b, a non-volatile memory interface module 202c, a controlling module (CPU) 202d, and an error control module 202e.

The host interface module 202a receives a command (e.g., read command, write command) from the host device 100 to perform a certain task (e.g., read, write, etc.) associated with the storage device 200. The volatile medium interface 202b is configured to communicate with the volatile memory 204. The non-volatile memory interface module 202c is configured to communicate with the non-volatile memory 206. The CPU 202d may include firmware which controls hardware interactions (i.e., 202a, 202b, 202c inside the storage device 200 according to requests made by the host device 100. The CPU 202d is configured to execute instructions stored in the storage device 200 and to perform various processes. The CPU 202d may include one or a plurality of processors, may be a general-purpose processor such as an application processor (AP), a graphics-only processing unit such as a graphics processing unit (GPU), a visual processing unit (VPU), and/or an Artificial Intelligence (AI) dedicated processor such as a neural processing unit (NPU).

The error control module 202e controls error correction of the data inside the flash memory storage (i.e., non-volatile memory 206/the NAND flash memory 206). Data may be stored/written on the NAND flash memory 206 with parity bits using an encoding process for ECC and the stored data is read from the NAND flash memory 206 using a decoding process for ECC.

For example, the host interface module 202a may receive a write command/catch/request from the host device 100 to store data (host data). In response to receiving the write request, the host interface module 202a sends the write request to the volatile memory 204 via the volatile medium interface 202b and stores the data in the volatile memory 204. When the storage device controller 202 accumulates the data worth of the smallest unit for the NAND flash memory 206, the storage device controller 202 flushes the data from the volatile memory 204 to the NAND flash memory 206 through an encoder 202ea. The encoder 202ea adds an error correction mechanism to the data with use of some additional data, such as parity bits. The parity bits defines the maximum correction capacity. For example, the parity bits defines the maximum number of bits for correction. The decoder 202eb removes the additional while reading back the data.

Furthermore, apart from the write cache, the volatile memory 204 is also used to store the information about metadata such as a mapping table/L2P Map. The mapping table stores logical to physical mapping information of all LBAs in the storage device 200.

Although the FIG. 3 shows various hardware components of the storage device 200, it is to be understood that example embodiments are not limited thereto. In other example embodiments, the storage device 200 may include less or more number of components. Further, the labels and names of the components are used only for illustrative purpose and do not limit the scope of example embodiments. One or more components can be combined together to perform same or substantially similar function to improve the reliability of the NAND flash memory 206 for intensive read workloads.

Figure 4A:
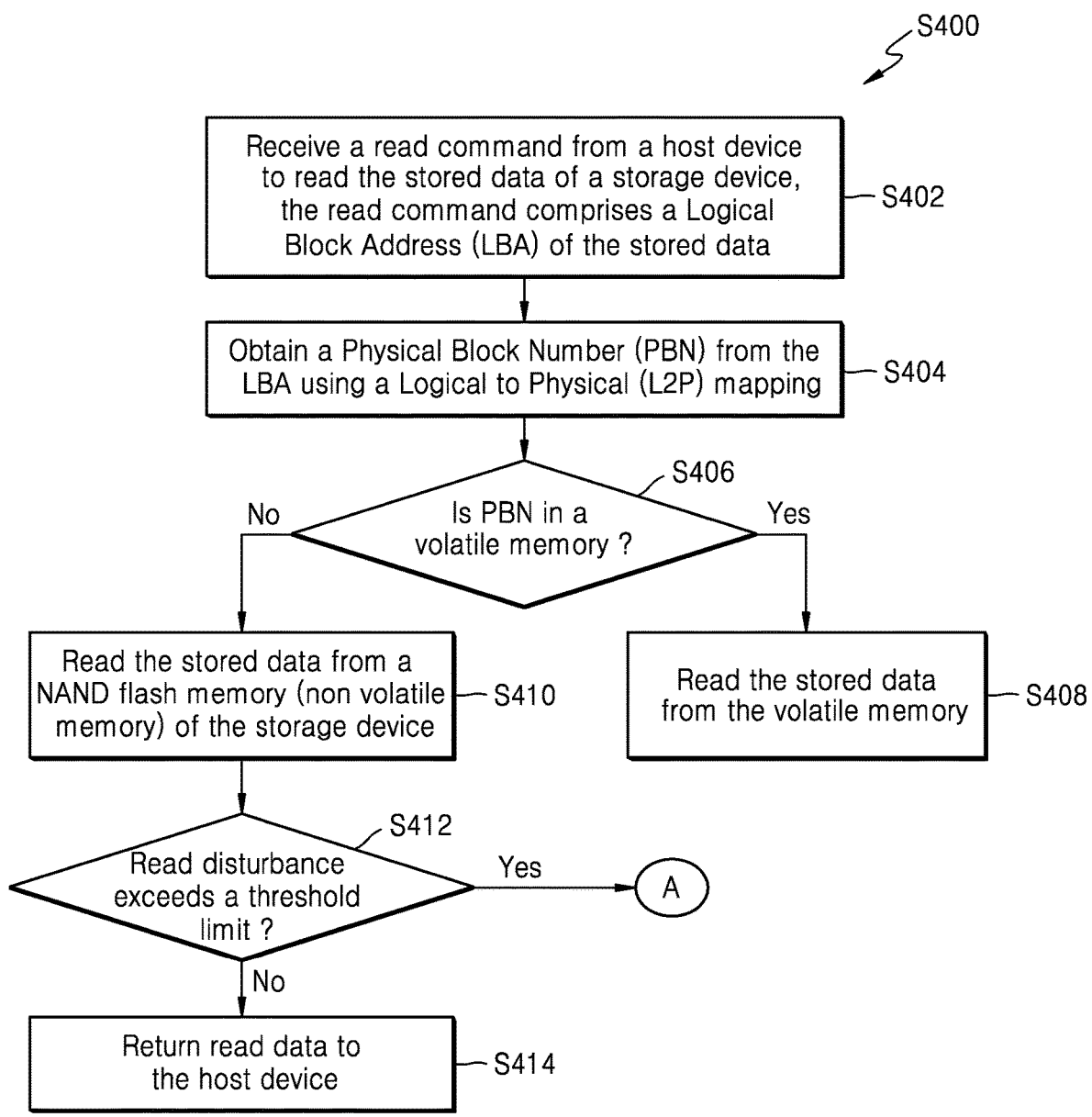
FIGS. 4A and 4B illustrate a flow diagram of a method for reading data from a NAND flash memory, according to an example embodiment.
Figure 4B:
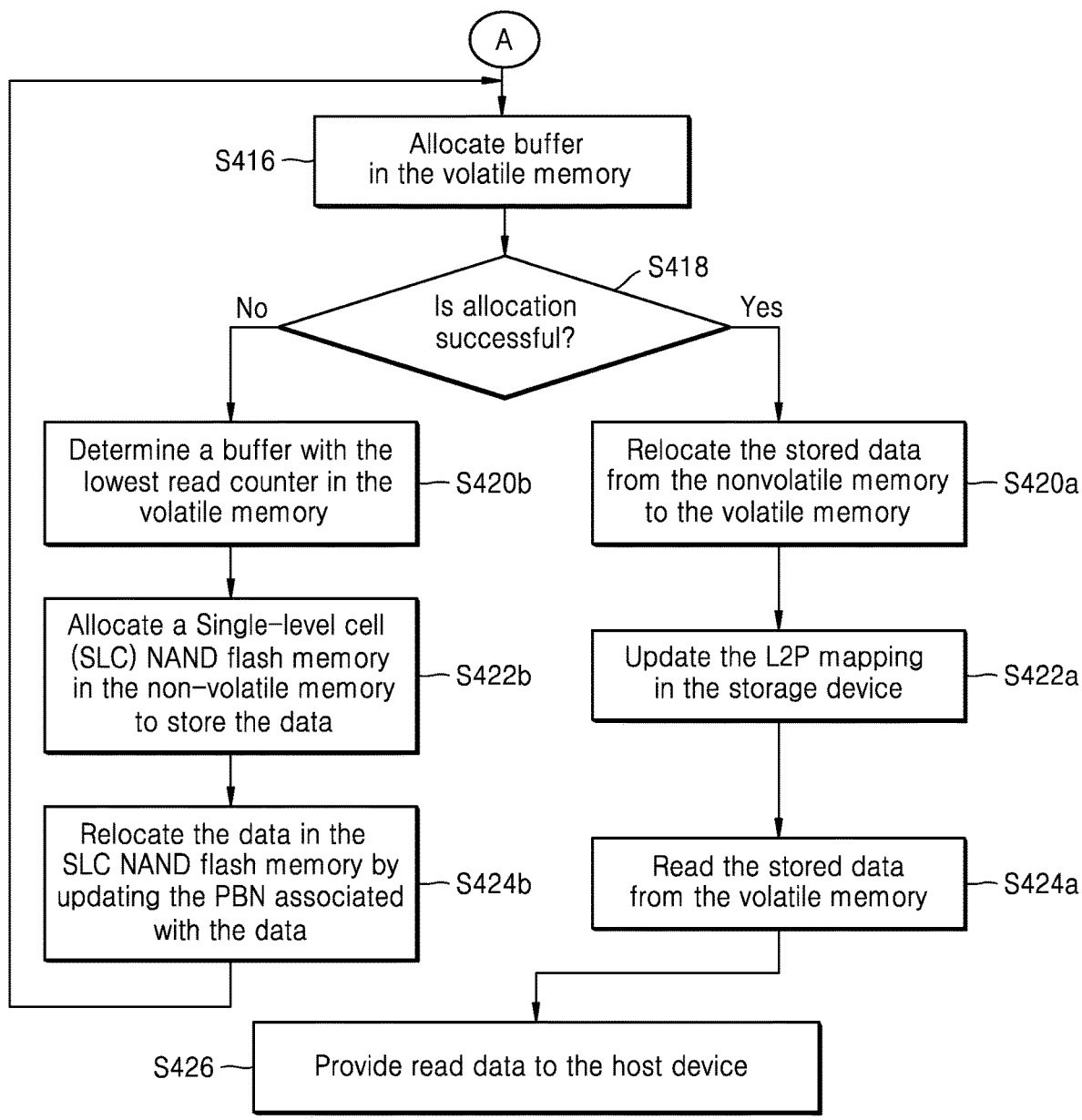

FIGS. 4A and 4B illustrate a flow diagram S400 of a method for reading data from a NAND flash memory, according to an example embodiment. For example, the operations S402-S426 may be performed by the storage device controller 202.

At S402, the read command is received from the host device 100 to read stored data of the storage device 200. The read command includes the LBA of the stored data. At S404, the PBN is obtained from the LBA using the L2P mapping. At S406, it is determined whether the PBN corresponds to the volatile memory 204 of the storage device 200. At S408, the stored data is read directly from the volatile memory 204 in response to determining that the PBN corresponds to the volatile memory 204 and the read counter associated with the PBN is incremented.

At S410, the stored data is read from the non-volatile memory 206 of the storage device 200 in response to determining that the PBN does not correspond to the volatile memory 204. At S412, it is determined whether the read disturbance exceeds the threshold limit while the stored data is read from the non-volatile memory 206. The threshold limit defines the maximum correction capacity. For example, the threshold limit defines the maximum number of bits for correction using parity bits. It is determined whether read disturbance exceeds the correction capacity based on the threshold limit. If the read disturbance exceeds the threshold limit, a read-threshold counter associated with the PBN also crosses a maximum read limit.

At S414, the stored data is read from the non-volatile memory 206 in response to determining that the read disturbance does not exceed the threshold limit the stored data is read from the non-volatile memory 206 and the read-threshold counter on the PBN does not cross the maximum read limit. At S416, the buffer in the volatile memory 204 is allocated in response to determining that the read disturbance exceeds the threshold limit while the stored data is read from the non-volatile memory 206. At S418, it is determined whether the allocation of the buffer in the volatile memory 204 is successful.

At S420a, the stored data is relocated from the non-volatile memory 206 to the volatile memory 204 in response to determining that the allocation of the buffer in the volatile memory 204 is successful. At S422a, the L2P mapping in the storage device 200 is updated. At S424a, the stored data is read from the volatile memory 204. At S426, read data is provided to the host device 100.

At S420b, the buffer with the lowest read counter in the volatile memory 204 is determined in response to determining that the allocation of the buffer in the volatile memory 204 is not successful. At S422b, the SLC NAND flash memory in the non-volatile memory 206 is allocated to store the data. At S424b, the data is relocated in the SLC NAND flash memory and the PBN associated with the data is updated. The data includes the low read counter among the plurality of read counters of the volatile memory 204. Thereafter, S416 is again performed, and the buffer in the volatile memory is allocated.

Figure 5:
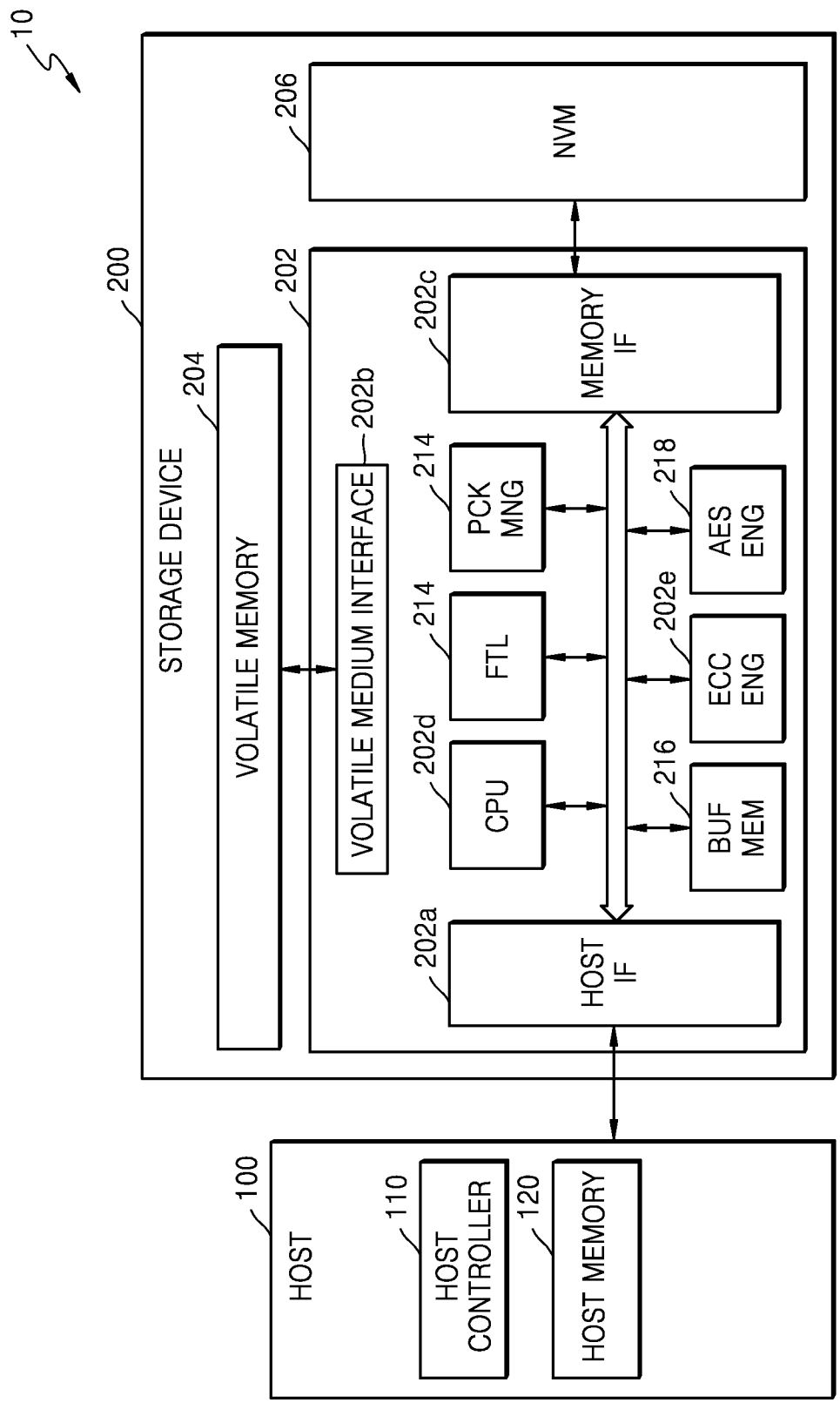
FIG. 5 is a block diagram of the host storage system, according to an example embodiment.

FIG. 5A is a detailed block diagram of the host storage system 10 according to an example embodiment.

The host storage system 10 may include the host device 100 and the storage device 200. Further, the storage device 200 may include the storage device controller 202, volatile memory 204 and the non-volatile memory 206. According to an example embodiment, the host device 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host device 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host device 100 and the storage device 200 may generate a packet according to an adopted standard protocol and transmit the packet.

When the non-volatile memory 206 of the storage device 200 includes a flash memory, the flash memory may include a 5D NAND memory array or a 3D (or vertical) NAND (VNAND) memory array. As another example, the storage device 200 may include various other kinds of non-volatile memories. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an example embodiment, the host controller 110 and the host memory 120 may be implemented as separate semiconductor chips. Alternatively, in some example embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the non-volatile memory 206 or an operation of storing data (e.g., read data) of the non-volatile memory 206 in the buffer region.

The storage device controller 202 may include a host interface module 202a, volatile medium interface 202b, non-volatile memory interface module 202c, and the controlling module 202d. Further, the storage device controller 202 may further include a flash translation layer (FTL) 214, a packet manager 215, a buffer memory 216, an error control module 202e, and an advanced encryption standard (AES) engine 218. The buffer memory 216 may include the write buffer 202g and read buffer 202f. The storage device controller 202 may further include a working memory in which the FTL 214 is loaded. The controlling module 202d may execute the FTL 214 to control data write and read operations on the NVM 206.

The host interface module 202a may transmit and receive packets to and from the host device 100. A packet transmitted from the host device 100 to the host interface module 202a may include a command or data to be written to the non-volatile memory 206. A packet transmitted from the host interface module 202a to the host device 100 may include a response to the command or data read from the non-volatile memory 206. The volatile medium interface 202b may transmit data to be written to the volatile memory 204 or receive data read from the volatile memory 204. The memory interface 202c may transmit data to be written to the non-volatile memory 206 to the non-volatile memory 206 or receive data read from the non-volatile memory 206. The memory interface 202c may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host device 100 into a physical address used to actually store data in the non-volatile memory 206. The wear-leveling operation may be a technique for preventing excessive deterioration of a specific block by allowing blocks of the non-volatile memory 206 to be uniformly used. As an example, the wear-leveling operation may be implemented using a firmware technique that balances erase counts of physical blocks. The garbage collection operation may be a technique for ensuring usable capacity in the non-volatile memory 206 by erasing an existing block after copying valid data of the existing block to a new block.

The packet manager 215 may generate a packet according to a protocol of an interface, which consents to the host device 100, or parse various types of information from the packet received from the host device 100. In addition, the buffer memory 216 may temporarily store data to be written to the non-volatile memory 206 or data to be read from the non-volatile memory 206. Although the buffer memory 216 may be a component included in the storage device controller 202, the buffer memory 216 may be outside the storage device controller 202.

The error control module 202e may perform error detection and correction operations on read data read from the non-volatile memory 206. More specifically, the error control module 202e may generate parity bits for write data to be written to the non-volatile memory 206, and the generated parity bits may be stored in the non-volatile memory 206 together with write data. During the reading of data from the non-volatile memory 206, the error control module 202e may correct an error in the read data by using the parity bits read from the non-volatile memory 206 along with the read data, and output error-corrected read data.

The AES engine 218 may perform at least one of an encryption operation and a decryption operation on data input to the storage device controller 202 by using a symmetric-key algorithm.

The example embodiments disclosed herein can be implemented using at least one hardware device and performing network management functions to control the elements.

While example embodiments have been shown and described above, it will be apparent to those skilled in the art that modifications and variations could be made without departing from the scope of the present inventive concept as defined by the appended claims.

What is claimed is:

1. A method for reading data in a storage device, the method comprising:
   receiving, by the storage device, a read command from a host device, wherein the read command comprises a Logical Block Address (LBA) of stored data to be read;
   obtaining, by the storage device, a Physical Block Number (PBN) based on the LBA and a Logical to Physical (L2P) mapping;
   determining, by the storage device, whether the PBN is a block of a volatile memory of the storage device;
   reading, by the storage device, the stored data directly from the volatile memory based on the PBN being a block of the volatile memory;
   incrementing, by the storage device, a read counter associated with the PBN based on the stored data being read directly from the volatile memory;
   reading, by the storage device, the stored data from a non-volatile memory of the storage device based on the PBN not being a block of the volatile memory; and
   determining, by the storage device, whether a read disturbance exceeds a threshold limit and whether the read counter exceeds a maximum read limit while the stored data is read from the non-volatile memory.

2. The method as claimed in claim 1, further comprising:
   reading, by the storage device, the stored data from the non-volatile memory based on the read disturbance not exceeding the threshold limit while the stored data is read from the non-volatile memory; and
   allocating, by the storage device, a buffer in the volatile memory based on the read disturbance exceeding the threshold limit while the stored data is read from the non-volatile memory.

3. The method as claimed in claim 2, wherein the stored data comprises parity bits, and
   wherein the threshold limit is a maximum number of bits for correction using the parity bits.

4. The method as claimed in claim 2, wherein the allocating the buffer in the volatile memory further comprises:
   determining, by the storage device, whether the buffer in the volatile memory has been successfully allocated;
   relocating, by the storage device, the stored data from the non-volatile memory to the volatile memory based on the allocating of the buffer in the volatile memory being successful;
   updating the L2P mapping based on the stored data being relocated to the volatile memory;
   reading the stored data from the volatile memory; and
   relocating data from the volatile memory to the non-volatile memory based on the allocating of the buffer in the volatile memory not being successful, wherein the relocated data comprises a lowest read counter among a plurality of read counters of the volatile memory.

5. The method as claimed in claim 4, wherein the relocating the data from the volatile memory to the non-volatile memory comprises:
identifying, by the storage device, the buffer based on the buffer corresponding to the lowest read counter in the volatile memory;
allocating, by the storage device, a block of a Single-level cell (SLC) NAND flash memory in the non-volatile memory to store the data;
relocating, by the storage device, the data in the SLC NAND flash memory; and
updating the PBN associated with the data to indicate the block of the SLC NAND flash memory.

6. The method as claimed in claim 1, further comprising:
reading, by the storage device, the stored data from the non-volatile memory based on the read counter not exceeding the maximum read limit while the stored data is read from the non-volatile memory; and
allocating, by the storage device, a buffer in the volatile memory based on the read counter exceeding the maximum read limit while the stored data is read from the non-volatile memory.

7. The method as claimed in claim 1, wherein the L2P mapping indicates an actual physical location for each LBA in the storage device.

8. A storage device comprising:
a volatile memory;
a non-volatile memory; and
a storage device controller, operably connected to the volatile memory and the non-volatile memory, configured to:
receive a read command from a host device, wherein the read command comprises a Logical Block Address (LBA) of stored data to be read;
obtain a Physical Block Number (PBN) based on the LBA and a Logical to Physical (L2P) mapping;
determine whether the PBN is a block of the volatile memory;
read the stored data directly from the volatile memory based on the PBN being a block of the volatile memory;
increment a read counter associated with the PBN based on the stored data being read directly from the volatile memory;
read the stored data from the non-volatile memory based on the PBN not being a block of the volatile memory; and
determine whether a read disturbance exceeds a threshold limit and whether the read counter exceeds a maximum read limit while the stored data is read from the non-volatile memory.

9. The storage device as claimed in claim 8, wherein the storage device controller is further configured to:
read the stored data from the non-volatile memory based on the read disturbance not exceeding the threshold limit while the stored data is read from the non-volatile memory; and
allocate a buffer in the volatile memory based on the read disturbance exceeding the threshold limit while the stored data is read from the non-volatile memory.

10. The storage device as claimed in claim 9, wherein the stored data comprises parity bits, and
wherein the threshold limit is a maximum number of bits for correction using the parity bits.

11. The storage device as claimed in claim 9, wherein the storage device controller is further configured to:
determine whether the buffer in the volatile memory has been successfully allocated;
relocate the stored data from the non-volatile memory to the volatile memory based on allocation of the buffer in the volatile memory being successful;
update the L2P mapping based on the stored data being relocated to the volatile memory;
read the stored data from the volatile memory;
relocate data from the volatile memory to the non-volatile memory based on allocation of the buffer in the volatile memory not being successful, wherein the relocated data comprises a lowest read counter from among a plurality of read counters of the volatile memory;
read the stored data from the non-volatile memory based on the read counter not exceeding the maximum read limit while the stored data is read from the non-volatile memory; and
allocate the buffer in the volatile memory based on the read counter exceeding the maximum read limit while the stored data is read from the non-volatile memory.

12. The storage device as claimed in claim 11, wherein the storage device controller is further configured to:
identify the buffer based on the buffer corresponding to the lowest read counter in the volatile memory;
allocate a block of a Single-level cell (SLC) NAND flash memory in the non-volatile memory to store the data;
relocate the data in the SLC NAND flash memory; and
update the PBN associated with the data to indicate the block of the SLC NAND flash memory.

13. The storage device as claimed in claim 8, wherein the storage device controller is further configured to:
read the stored data from the non-volatile memory based on the read counter not exceeding the maximum read limit while the stored data is read from the non-volatile memory; and
allocate a buffer in the volatile memory based on the read counter exceeding the maximum read limit while the stored data is read from the non-volatile memory.

14. The storage device as claimed in claim 8, wherein the L2P mapping indicates an actual physical location for each LBA in the storage device.

15. A storage device controller comprising:
at least one processor configured to:
receive a read command from a host device, wherein the read command comprises a Logical Block Address (LBA) of stored data to be read;
obtain a Physical Block Number (PBN) based on the LBA and a Logical to Physical (L2P) mapping;
determine whether the PBN is a block of a volatile memory of a storage device;
read the stored data directly from the volatile memory based on the PBN being a block of the volatile memory;
increment a read counter associated with the PBN based on the stored data being read directly from the volatile memory;
read the stored data from a non-volatile memory of the storage device based on the PBN not being a block of the volatile memory; and
determine whether a read disturbance exceeds a threshold limit and whether the read counter exceeds a maximum read limit while the stored data is read from the non-volatile memory.

16. The storage device controller as claimed in claim 15, wherein the at least one processor is further configured to:

read the stored data from the non-volatile memory based on the read disturbance not exceeding the threshold limit while the stored data is read from the non-volatile memory;

allocate a buffer in the volatile memory based on the read disturbance exceeding the threshold limit while the stored data is read from the non-volatile memory;

read the stored data from the non-volatile memory based on the read counter not exceeding the maximum read limit while the stored data is read from the non-volatile memory; and allocate the buffer in the volatile memory based on the read counter exceeding the maximum read limit while the stored data is read from the non-volatile memory.

17. The storage device controller as claimed in claim 16, wherein the stored data comprises parity bits, and wherein the threshold limit is a maximum number of bits for correction using the parity bits.

18. The storage device controller as claimed in claim 15, wherein the at least one processor is further configured to:

read the stored data from the non-volatile memory based on the read disturbance not exceeding the threshold limit while the stored data is read from the non-volatile memory;

determine whether a buffer in the volatile memory has been successfully allocated;

relocate the stored data from the non-volatile memory to the volatile memory based on allocation of the buffer in the volatile memory being successful;

update the L2P mapping based on the stored data being relocated to the volatile memory;

read the stored data from the volatile memory; and relocate data from the volatile memory to the non-volatile memory based on allocation of the buffer in the volatile memory not being successful, wherein the relocated data comprises a lowest read counter from among a plurality of read counters of the volatile memory.

19. The storage device controller as claimed in claim 18, wherein the at least one processor is further configured to:

identify the buffer based on the buffer corresponding to the lowest read counter in the volatile memory;

allocate a block of a Single-level cell (SLC) NAND flash memory in the non-volatile memory to store the data;

relocate the data in the SLC NAND flash memory; and update the PBN associated with the data to indicate the block of the SLC NAND flash memory.

20. The storage device controller as claimed in claim 15, wherein the storage device controller is further configured to:

read the stored data from the non-volatile memory based on the read counter not exceeding the maximum read limit while the stored data is read from the non-volatile memory; and allocate a buffer in the volatile memory based on the read counter exceeding the maximum read limit while the stored data is read from the non-volatile memory.

\* \* \* \* \*